United States Patent
Cambou

(10) Patent No.: US 9,588,908 B2
(45) Date of Patent: Mar. 7, 2017

(54) MEMORY CIRCUIT USING RESISTIVE RANDOM ACCESS MEMORY ARRAYS IN A SECURE ELEMENT

(71) Applicant: Bertrand F. Cambou, Flagstaff, AZ (US)

(72) Inventor: Bertrand F. Cambou, Flagstaff, AZ (US)

(*) Notice: Subject to any disclaimer, the term of this patent is extended or adjusted under 35 U.S.C. 154(b) by 9 days.

(21) Appl. No.: 14/869,262

(22) Filed: Sep. 29, 2015

(65) Prior Publication Data

US 2017/0010981 A1    Jan. 12, 2017

Related U.S. Application Data

(60) Provisional application No. 62/169,957, filed on Jun. 2, 2015.

(51) Int. Cl.
*G06F 21/00* (2013.01)
*G06F 12/14* (2006.01)
(Continued)

(52) U.S. Cl.
CPC ...... *G06F 12/1408* (2013.01); *G06F 12/1466* (2013.01); *G11C 13/0004* (2013.01); *G11C 13/0007* (2013.01); *G11C 13/0011* (2013.01); *G11C 13/0097* (2013.01); *G11C 15/046* (2013.01); *H04L 9/14* (2013.01); *H04L 9/30* (2013.01); *G06F 2212/1052* (2013.01); *G06F 2212/402* (2013.01)

(58) Field of Classification Search
CPC ............ G06F 12/1408; G06F 12/1466; G06F 2212/1052; G06F 2212/402; G11C 15/046; G11C 13/0097; G11C 13/0004; G11C 13/0007; G11C 13/0011; H04L 9/30; H04L 9/14
See application file for complete search history.

(56) References Cited

U.S. PATENT DOCUMENTS

| 4,532,438 A | 7/1985 | Reiner |
| 4,899,154 A | 2/1990 | Colles |

(Continued)

OTHER PUBLICATIONS

Wang, Yuhao, et al. "Energy efficient in-memory AES encryption based on nonvolatile domain-wall nanowire.", Retrieved from http://ieeexplore.ieee.org/stamp/stamp.jsp?arnumber=6800397 , 2014 Design, Automation & Test in Europe Conference & Exhibition (DATE). IEEE, 2014.*

(Continued)

*Primary Examiner* — Chau Le
*Assistant Examiner* — Muhammad Chaudhry
(74) *Attorney, Agent, or Firm* — Barclay Damon, LLP

(57) ABSTRACT

A memory circuit using resistive random access memory (ReRAM) arrays in a secure element. The ReRAM arrays can be configured as content addressable memories (CAMs) or random access memories (RAMs) on the same die, with the control circuitry for performing comparisons of reference patterns and input patterns located outside of the ReRAM arrays. By having ReRAM arrays configured as CAMs and RAMs on the same die, certain reference patterns can be stored in CAMs and others in RAMs depending on security needs. For additional security, a heater can be used to erase reference patterns in the ReRAM arrays when desired.

15 Claims, 7 Drawing Sheets

(51) Int. Cl.
  *G11C 15/04* (2006.01)
  *G11C 13/00* (2006.01)
  *H04L 9/30* (2006.01)
  *H04L 9/14* (2006.01)

(56) References Cited

U.S. PATENT DOCUMENTS

| | | | |
|---|---|---|---|
| 5,589,785 | A | 12/1996 | Garavan |
| 6,314,014 | B1 | 11/2001 | Lowrey et al. |
| 6,317,349 | B1 | 11/2001 | Wong |
| 6,331,961 | B1 | 12/2001 | Kengeri et al. |
| 6,370,061 | B1 | 4/2002 | Yachareni et al. |
| 6,430,073 | B1 | 8/2002 | Batson et al. |
| 6,498,751 | B2 | 12/2002 | Ordonez et al. |
| 6,542,409 | B2 | 4/2003 | Yamada |
| 6,873,551 | B2 | 3/2005 | Bedarida et al. |
| 7,016,211 | B2 | 3/2006 | Park et al. |
| 7,082,056 | B2 | 7/2006 | Chen et al. |
| 7,085,155 | B2 | 8/2006 | Ovshinsky et al. |
| 7,088,603 | B2 | 8/2006 | Patel |
| 7,110,275 | B2 | 9/2006 | Park |
| 7,227,765 | B2 | 6/2007 | De Sandre et al. |
| 7,307,860 | B2 | 12/2007 | Hu |
| 7,342,832 | B2 | 3/2008 | Lee et al. |
| 7,436,698 | B2 | 10/2008 | Lin et al. |
| 7,483,305 | B2 | 1/2009 | Yamada |
| 7,486,530 | B2 | 2/2009 | Hartono et al. |
| 7,508,022 | B2 | 3/2009 | Amo et al. |
| 7,518,897 | B2 | 4/2009 | Nozieres et al. |
| 8,089,793 | B1 | 1/2012 | Gharia |
| 8,174,877 | B2 | 5/2012 | Baks |
| 8,228,703 | B2 | 7/2012 | Javerliac et al. |
| 8,286,227 | B1 | 10/2012 | Zheng |
| 8,513,791 | B2 | 8/2013 | Bucki et al. |
| 8,576,599 | B2 | 11/2013 | Atwal et al. |
| 8,634,247 | B1 | 1/2014 | Sprouse et al. |
| 8,717,794 | B2 | 5/2014 | Cambou et al. |
| 8,763,101 | B2 | 6/2014 | Counterman |
| 8,780,633 | B2 | 7/2014 | Sprouse et al. |
| 8,806,205 | B2 | 8/2014 | Metke et al. |
| 8,817,541 | B2 | 8/2014 | Li et al. |
| 2007/0220594 | A1 | 9/2007 | Tulsyan |
| 2009/0190404 | A1 | 7/2009 | Roohparvar |
| 2011/0208906 | A1 | 8/2011 | Gillingham |
| 2011/0249480 | A1 | 10/2011 | Cho |
| 2012/0143554 | A1 | 6/2012 | Cambou et al. |
| 2014/0185349 | A1 | 7/2014 | Terzioglu et al. |
| 2015/0220457 | A1* | 8/2015 | Katoh ............... G09C 1/00 713/193 |
| 2016/0004646 | A1* | 1/2016 | Maeda ............... G06F 21/62 713/193 |

OTHER PUBLICATIONS

Akinaga, Hiroyuki, et al. "Resistive random access memory (ReRAM) based on metal oxides.", Retrieved from http://ieeexplore.ieee.org/stamp/stamp.jsp?arnumber=5607274 , Proceedings of the IEEE 98.12 (2010): 2237-2251.*

Applied Physics Letters (AIP), Volatile resistive switching in Cu/TaOx/δ-Cu/Pt devices, by Tong Liu et al., view online: http://dx.doi.org/10.1063/1.4746276, published by the American Institute of Physics, 2012, 5 pages.

ECS Solid State Letters, 2 (7) Q54-Q57, Composite Cu/$V_o$ and $V_o$/Cu Nanofilaments in Cu/$Ta_2O_5$/Pt Devices by Yuhong Kang et al., Bradley Department of Electrical and Computer Engineering, Blacksburg Virginia, Published May 17, 2013, 4 pages.

International Search Report & Written Opinion, Application No. PCT/US2015/052913, Applicant, Bertrand F. Cambou, Mailed Dec. 29, 2015, 8 pages.

* cited by examiner

| BCAM | Matching? | |
|---|---|---|
| Input \ Stored | "0" | "1" |
| "0" | Yes | No |
| "1" | No | Yes |

FIG. 1A
(Prior Art)

| TCAM | Matching? | | |
|---|---|---|---|
| Input \ Stored | "0" | "1" | "BX" |
| "0" (0,1) | Yes | No | Yes |
| "1" (1,0) | No | Yes | Yes |
| "BX" (1,1) | Yes | Yes | Yes |

FIG. 1B
(Prior Art)

MEMORY CIRCUIT USING RESISTIVE RANDOM ACCESS MEMORY ARRAYS IN A SECURE ELEMENT

CROSS-REFERENCE TO RELATED APPLICATIONS

This application claims the benefit of and priority to U.S. Provisional Patent Application Ser. No. 62/169,957, filed Jun. 2, 2015, and entitled "Resistive RAM (ReRAM) architectures for secure systems," the entirety of which is incorporated herein by reference.

BACKGROUND OF THE INVENTION

The subject matter disclosed herein relates to memory, and more particularly to the use of a memory circuit using resistive random access memory arrays in a secure element.

Many different types of memory circuits can be used to compare input data (e.g., an input pattern or search data) against stored data (e.g., reference pattern(s) or a table of stored data). One example of such a memory circuit is a Content Addressable Memory (CAM). When a CAM determines a match between the input data and the stored data, it returns the address(es) of the matching data.

A two-state CAM (or Binary CAM (BCAM)) uses binary data consisting entirely of two states (0s and 1s) for comparing input data to stored data as shown in the exemplary two-state CAM truth table of FIG. 1A. The two-state CAM truth table (FIG. 1A) is of an XOR gate (Exclusive OR), wherein the output is "yes" for a match only if both the input state and the stored state are the same. Conversely, the output is a "no" for a mismatch if the input state does not match the stored state.

A three-state CAM (or Ternary CAM (TCAM)) uses data consisting of 0s and 1s as well as a third state known as a "no care" state (or "BX" state) as shown in the exemplary three-state truth table of FIG. 1B. The TCAM truth table (FIG. 1B) is also of an XOR gate (Exclusive OR), wherein the output is "yes" for a match only if (a) the input state and the stored state are the same, (b) the stored state is a "no care" state (BX) regardless of the input state (0, 1, or BX), or (c) the input state is a "no care" state (BX) regardless of the stored state (0, 1, or BX). Conversely, the output is a "no" for a mismatch if the input state does not match the stored state, except in the case where the input state or the stored state is a "no care" state (BX). In many cases, the input data is a stream of several bits, where each input bit must be compared to a stored bit in a CAM cell to determine if all of the bits match to provide a "yes" output.

Most conventional CAMs are built with static random access memory (SRAM) cells or Flash Negative-AND (NAND) cells, where a typical two-state CAM consists of two cells/bit and a typical three-state CAM consists of four cells/bit. Given the high speed of the cells, conventional CAMs allow for stored of information that can be retrieved rapidly. However, SRAMs and Flash cells operate at high power and can be expensive to produce. In addition, conventional CAM arrays for handling multiple bits are manufactured with the control circuitry (e.g., comparators) for comparing the input data and the stored data within the array, increasing the complexity and cost of the memory circuits, while restricting the flexibility of the CAM arrays.

While SRAM, Flash, and other type of memory cells have states that are determined by charge or voltage levels (high ("1") or low ("0")), another type of non-volatile memory cell known as Resistive Random Access Memory (referred to as Resistive RAM, RRAM, or ReRAM) have states determined by the resistance level (high or low) and do not trap charges. For example, an electric current can be applied to a ReRAM cell and change the resistance of the material in the cell, which resistance can then be measured, and a "0" (low resistance) or a "1" (high resistance) state can be read. Presently, there are several types of ReRAM that have been introduced, including phase change memories (PCM), conductive bridge random access memory (CBRAM), and metal oxide ReRAMs.

The discussion above is merely provided for general background information and is not intended to be used as an aid in determining the scope of the claimed subject matter.

BRIEF DESCRIPTION OF THE INVENTION

A memory circuit using resistive random access memory (ReRAM) arrays in a secure element is disclosed. The ReRAM arrays can be configured as CAMs or RAMs on the same die, with the control circuitry for performing comparisons of reference patterns and input patterns located outside of the ReRAM arrays. By having ReRAM arrays configured as CAMs and RAMs on the same die, certain reference patterns can be stored in CAMs and others in RAMs depending on security needs. For additional security, a heater can be used to erase reference patterns in the ReRAM arrays when desired.

In one embodiment, a secure element is disclosed. The secure element includes a first die, a first resistive random access memory (ReRAM) array configured as a content addressable memory (CAM) located on the first die, wherein the CAM comprises a first block of a plurality of ReRAM cells configured for storing a first reference pattern and a second block of a plurality of ReRAM cells configured for receiving a first input pattern, and a second ReRAM array configured as a random access memory (RAM) located on the first die, wherein the RAM comprises a third block of a plurality of ReRAM cells configured for storing a second reference pattern. The secure element can also include a compare circuit for comparing the first plurality of ReRAM cells configured for storing the first reference pattern to the second plurality of ReRAM cells for receiving the first input pattern, wherein the compare circuit is located outside of the first ReRAM array and the second ReRAM array. The secure element can also include a heater located on the first ReRAM array or the second ReRAM array, wherein the heater is configured to heat the ReRAM array and erase the reference patterns.

In another embodiment, a secure element includes a resistive random access memory (ReRAM) array configured as a content addressable memory (CAM), wherein the CAM comprises a first block of a plurality of ReRAM cells configured for storing a reference pattern and a second block of a plurality of ReRAM cells configured for receiving an input pattern, a first plurality of bit lines connected to the first block of a plurality of ReRAM cells, a second plurality of bit lines connected to the second block of a plurality of ReRAM cells, and a compare circuit for comparing the first plurality of bit lines to the second plurality of bit lines. In one embodiment, the compare circuit is located outside of the ReRAM array. In one embodiment, the secure element also includes a heater located on the ReRAM array, wherein the heater is configured to heat the ReRAM array and erase the reference pattern.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which:

FIGS. 1A and 1B are illustrations of exemplary truth tables for two-state CAMs (BCAMs) and three-state CAMs (TCAMS);

DETAILED DESCRIPTION OF THE INVENTION

Figure 2:
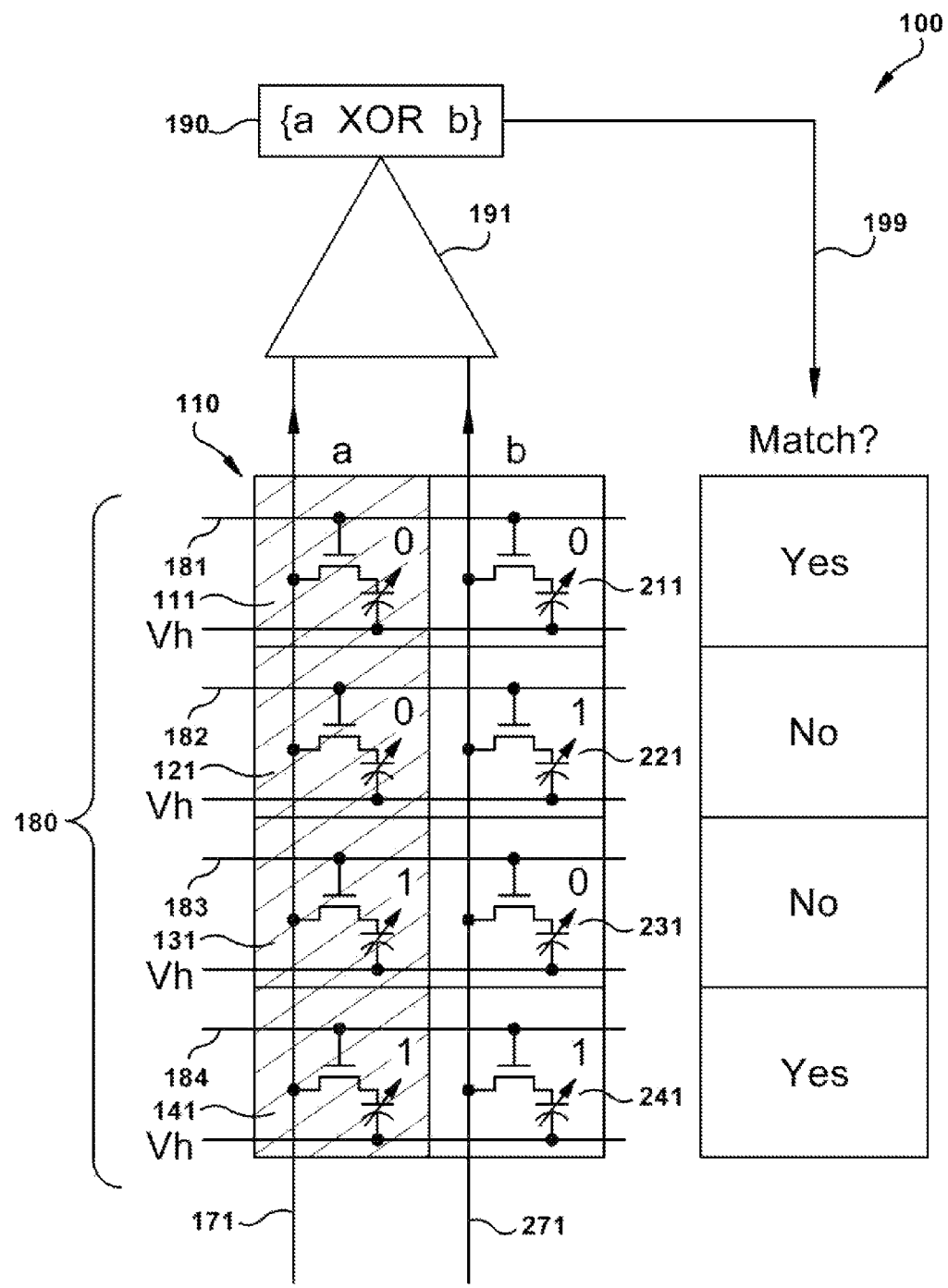
FIG. 2 is a diagram of an exemplary two-state CAM (BCAM) implemented with a ReRAM array.

FIG. 2 is a diagram of a ReRAM array 110 configured as an exemplary two-state CAM (BCAM) 100. The ReRAM array 110 can include phase change memories (PCM), conductive bridge random access memory (CBRAM), or metal oxide ReRAMs. As shown in FIG. 2, the exemplary two-state CAM 100 includes a ReRAM array 110 and compare circuitry 190. The ReRAM array 110 of the two-state CAM 100 comprises a first block of a plurality of stored data ReRAM cells 111, 121, 131, 141 for storing one or more reference patterns (e.g., words or keys) and a second block of a plurality of input data ReRAM cells 211, 221, 231, 241 for receiving one or more input patterns downloaded via the input data bit line 271. While the exemplary two-state CAM (BCAM) 100 of FIG. 2 shows a single bit reference pattern for illustrative purposes, it will be understood that that reference pattern can be several thousands of bits long. It will be understood that the term ReRAM arrays as used herein comprises resistive ReRAM cells that are not necessarily configured as a RAM, but can be configured as a CAM.

In the exemplary two-state CAM 100 of FIG. 2, there are two ReRAM cells per single bit, with one cell 111, 121, 131, 141 for storing the reference pattern and a second cell 211, 221, 231, 241 for receiving the input pattern. As shown in FIG. 2, the ReRAM cells can be in a low resistance state ("0") or a high resistance state ("1").

A plurality of pattern (or word) select lines 180 can be used to select a particular reference pattern to be compared to an input pattern during an authentication cycle. For example (1) a first pattern select line 181 for the first row is activated to compare the stored data in the stored data ReRAM cell 111 for the first pattern to the input data in the input data ReRAM cell 211 for the first pattern, (2) a second pattern select line 182 for the second row is activated to compare the stored data in the stored data ReRAM cell 121 for the second pattern to the input data in the input data ReRAM cell 221 for the second pattern, (3) a third pattern select line 182 for the third row is activated to compare the stored data in the stored data ReRAM cell 131 for the third pattern to the input data in the input data ReRAM cell 231 for the third pattern, and (4) a fourth pattern select line 184 for the fourth row is activated to compare the stored data in the stored data ReRAM cell 141 for the fourth pattern to the input data in the input data ReRAM cell 241 for the fourth pattern. As shown in FIG. 2, when activated, the pattern select lines 180-184 activate a transistor in each cell in a particular row. Once a cell is activated, the bit lines 171, 271 can read the state of the ReRAM cell as either in a low resistance state ("0") or a high resistance state ("1"). In one embodiment to provide sufficient flexibility, the resistive element of the ReRAM cell is connected between the transistor and a control voltage (Vh) to correctly polarize the resistive element.

The matching operation works sequentially with one row tested during one authentication cycle at a time with the stored data bit line 171, and the input data bit line 271 activated concurrently. The compare circuitry 190 of the two-state CAM 100 can implement the BCAM truth table shown in FIG. 1A using an XOR gate (Exclusive OR), wherein the output 199 of the compare circuitry 190 is "yes" for a match only if both the input pattern on the input data bit line 271 and the stored reference pattern on the stored data bit line 171 are the same. Conversely, the output is a "no" for a mismatch if the input pattern on the input data bit line 271 does not match the stored reference pattern on the stored data bit line 171. In one embodiment, the compare circuitry 190 includes a comparator 191 to compare the input pattern on the input data bit line 271 to the stored reference pattern on the stored data bit line 171. This single comparator 191 can be used to compare the reference pattern and the input pattern in each row of the ReRAM array 110.

As shown in FIG. 2, the exemplary two-state CAM 100 includes compare circuitry 190 that is located outside of the ReRAM array 110. For example, the ReRAM array 110 can be located on a first die and the compare circuitry 190 can be located on a second die, or the ReRAM array 110 and the compare circuitry 190 can be located on the same die. Locating the compare circuitry 190 outside of the ReRAM array 110 simplifies the manufacturing of the ReRAM array 110 and allows greater flexibility in the configuration of the ReRAM array 110 independent of the requirements of the compare circuitry 190. This separation of the ReRAM array 110 from the required control circuitry 190 allows for a ReRAM array on a single die to be divided into different sections (RAM, CAM, etc.) with uniform manufacturing of the ReRAM array.

Figure 3:
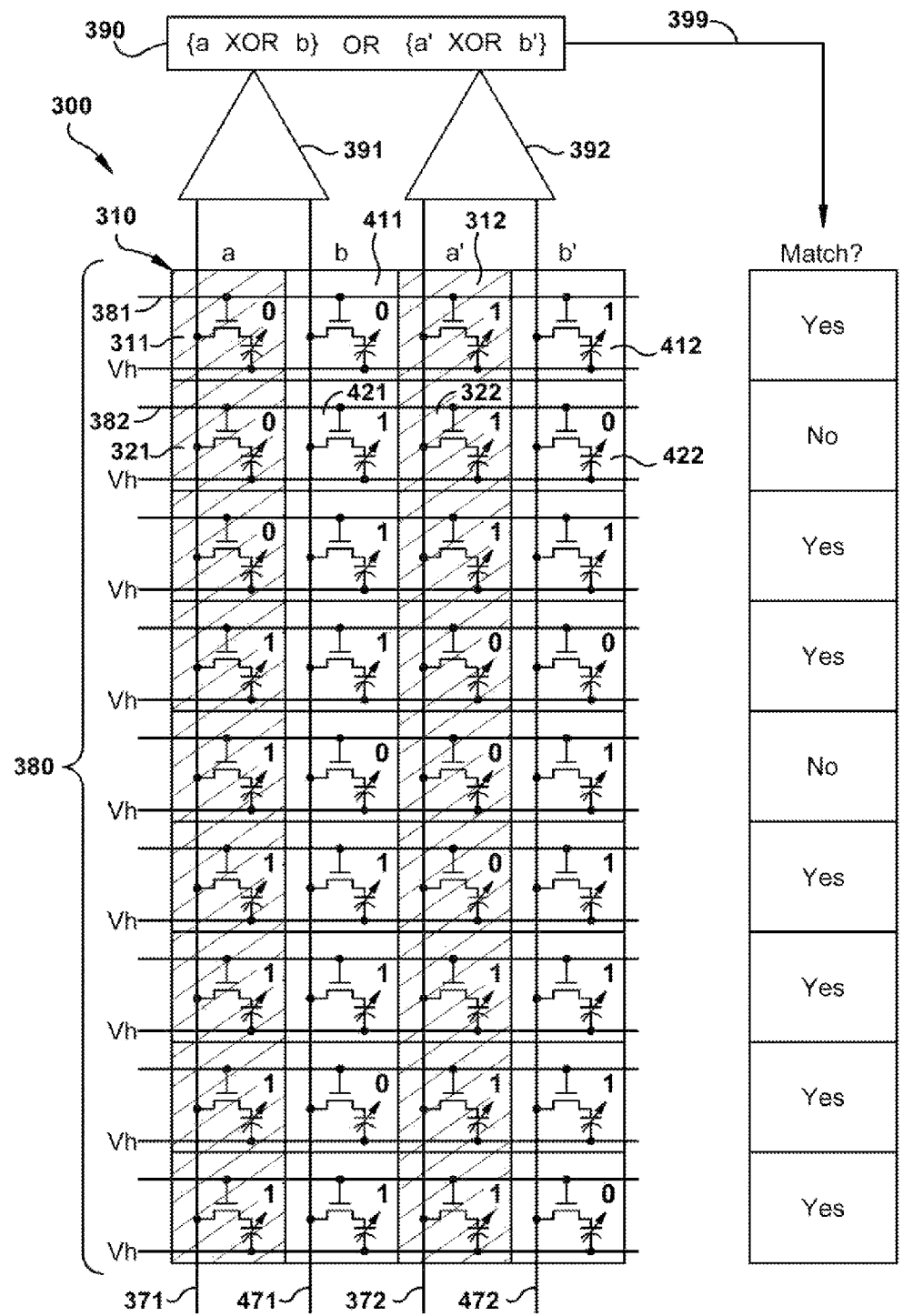
FIG. 3 is a diagram of an exemplary three-state CAM (TCAM) implemented with a ReRAM array.

FIG. 3 is a diagram of a ReRAM array 310 configured as an exemplary three-state CAM (TCAM). The ReRAM array 310 can include phase change memories (PCM), conductive bridge random access memory (CBRAM), or metal oxide ReRAMs. As shown in FIG. 3, the exemplary three-state CAM 300 includes a ReRAM array 310 and compare circuitry 390. The ReRAM array 310 of the three-state CAM 300 comprises a first block of a plurality of stored data ReRAM cells (e.g., 311, 312, 321, 322) for storing one or more reference patterns (e.g., words or keys) and a second block of a plurality of input data ReRAM cells (e.g., 411, 412, 421, 422) for receiving one or more input patterns downloaded via the input data bit lines 471, 472. While the exemplary three-state CAM (TCAM) 100 of FIG. 3 shows a two bit reference pattern for illustrative purposes, it will be understood that that reference pattern can be several thousands of bits long.

In the exemplary three-state CAM 100 of FIG. 3, there are four ReRAM cells in a row for the first two bit reference pattern with two cells 311, 312 for storing the reference pattern as a pair of bits (a, a') and another two cells 411, 412 for receiving the input pattern downloaded as a pair of bits (b, b'). Similarly, there are four ReRAM cells in a row for the second two bit reference pattern, with two cells 321, 322 for storing the reference pattern as a pair of bits (a, a') and another two cells 421, 422 for receiving the input pattern downloaded as a pair of bits (b, b'). As shown in FIG. 3, the ReRAM cells can be in a low resistance state ("0") or a high resistance state ("1").

A plurality of pattern (or word) select lines 380 can be used to select a particular reference pattern to be compared an input pattern during an authentication cycle. For example (1) a first pattern select line 381 for the first row is activated to compare the stored data in the stored data ReRAM cells 311, 312 for the first pattern to the input data in the input data ReRAM cells 411, 412 for the first pattern, and (2) a second pattern select line 382 for the second row is activated to compare the stored data in the stored data ReRAM cells 321, 322 for the second pattern to the input data in the input data ReRAM cells 421, 422 for the second pattern. As shown in FIG. 3, when activated, the pattern select lines 380-382 activate a transistor in each cell in a particular row. Once a cell is activated, the bit lines 371, 372, 471, 472 can read the state of the ReRAM cell as either in a low resistance state ("0") or a high resistance state ("1"). In one embodiment to provide sufficient flexibility, the resistive element of the ReRAM cell is connected between the transistor and a control voltage (Vh) to correctly polarize the resistive element.

The matching operation works sequentially with one row tested during one authentication cycle at a time with the stored data bit lines 371, 372 and the input data bit lines 471, 472 activated concurrently. The compare circuitry 390 of the three-state CAM 300 can implement the TCAM truth table shown in FIG. 1B using two XOR gates (Exclusive OR) ({a XOR b} OR {a' XOR b'}), wherein the output 399 of the compare circuitry 390 is "yes" for a match only if (a) the input pattern on the input data bit lines 371, 372 and the stored reference pattern on the stored data bit lines 471, 472 are the same, (b) the stored reference pattern is a "no care" state (BX) regardless of the input pattern (0, 1, or BX), or (c) the input pattern is a "no care" state (BX) regardless of the stored reference pattern (0, 1, or BX). Conversely, the output is a "no" for a mismatch if the input pattern does not match the stored reference pattern, except in the case where the input pattern or the stored reference pattern is a "no care" state (BX). In one embodiment, the compare circuitry 390 includes (1) a first comparator 391 to compare the first bit of the input pattern on the first input data bit line 471 and the first bit of the stored reference pattern on the first stored data bit line 371, and (2) a second comparator 392 to compare the second bit of the input pattern on the second input data bit line 472 and the second bit of the stored reference pattern on the second stored data bit line 372. These comparators 391, 392 can be used to compare the reference pattern and the input pattern in each row of the ReRAM array 310.

As shown in FIG. 3, the exemplary three-state CAM 100 includes compare circuitry 390 that is located outside of the ReRAM array 310. For example, the ReRAM array 310 can be located on a first die and the compare circuitry 390 can be located on a second die, or the ReRAM array 310 and the compare circuitry 390 can be located on the same die. Locating the compare circuitry 390 outside of the ReRAM array 310 simplifies the manufacturing of the ReRAM array 310 and allows greater flexibility in the configuration of the ReRAM array 310 independent of the requirements of the compare circuitry 390. This separation of the ReRAM array 310 from the required control circuitry 390 allows for a ReRAM array on a single die to be divided into different sections (RAM, CAM, etc.) with uniform manufacturing of the ReRAM array.

Figure 4:
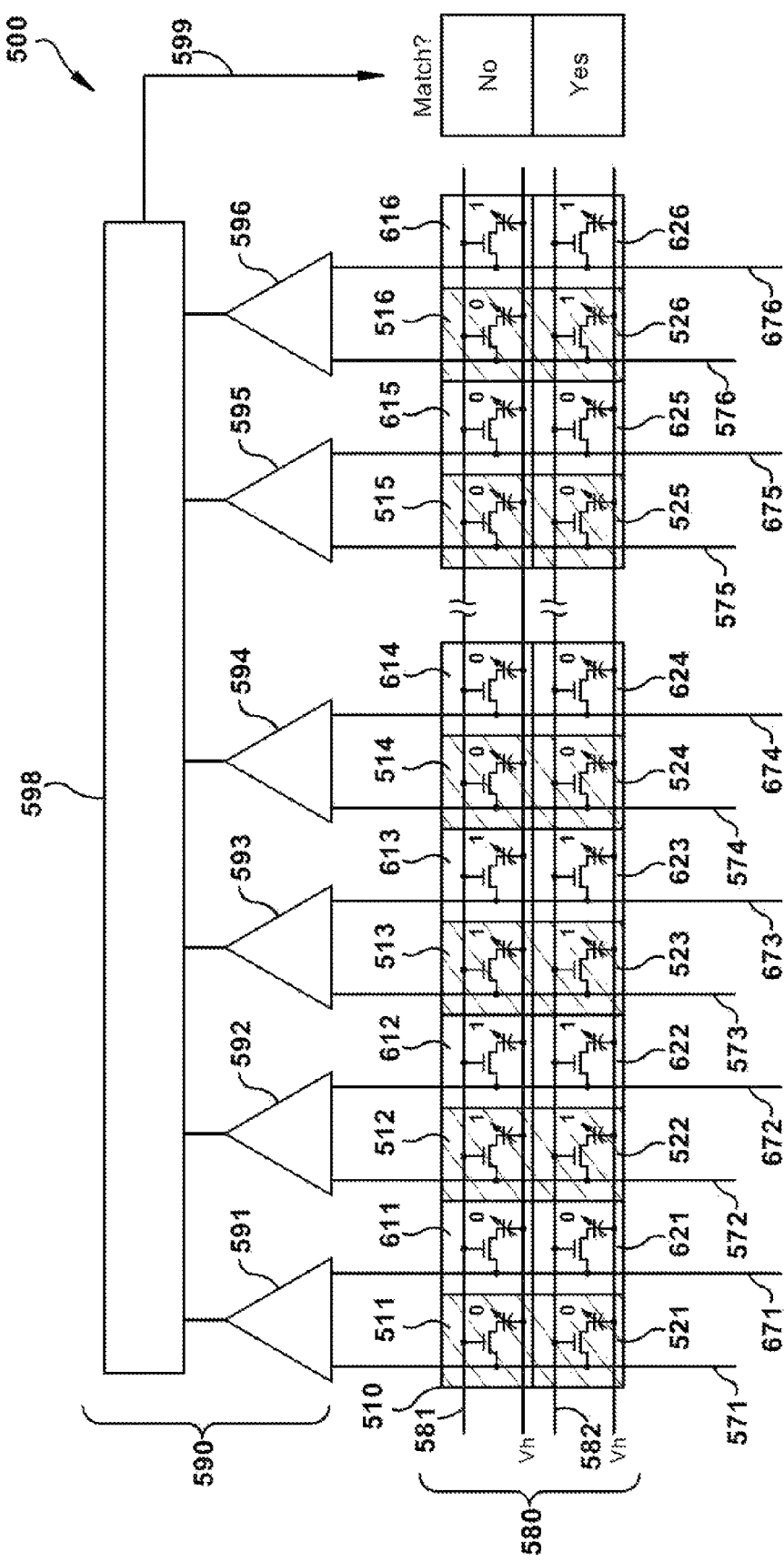
FIG. 4 is a diagram of another exemplary two-state CAM (BCAM) implemented with a ReRAM array.

FIG. 4 is a diagram of a ReRAM array 510 configured as an exemplary two-state CAM (BCAM) 500. The ReRAM array 510 can include phase change memories (PCM), conductive bridge random access memory (CBRAM), or metal oxide ReRAMs. As shown in FIG. 4, the exemplary two-state CAM 500 includes a ReRAM array 510 and compare circuitry 590. The first row of the ReRAM array 510 of the two-state CAM 500 comprises a first block of a plurality of stored data ReRAM cells 511, 512, 513, 514, 515, 516 for storing a first reference pattern (e.g., a word or key) and a second block of plurality of input data ReRAM cells 611, 612, 613, 614, 615, 616 for receiving an input pattern downloaded via the input data bit lines 671, 672, 673, 674, 675, 676. Similarly, the second row of the ReRAM array 510 of the two-state CAM 500 comprises a plurality of stored data ReRAM cells 521, 522, 523, 524, 525, 526 for storing a second reference pattern (e.g., a word or key) and a plurality of input data ReRAM cells 621, 622, 623, 624, 625, 626 for receiving the input pattern downloaded via the input data bit lines 671, 672, 673, 674, 675, 676. While the exemplary two-state CAM (BCAM) 500 of FIG. 4 shows a six bit reference pattern for illustrative purposes, it will be understood that that reference pattern can be several thousands of bits long. As shown in FIG. 4, the ReRAM cells can be in a low resistance state ("0") or a high resistance state ("1").

A plurality of pattern (or word) select lines 580 can be used to select a particular reference pattern to be compared an input pattern during an authentication cycle. For example (1) a first pattern select line 581 for the first row is activated to compare the stored data in the stored data ReRAM cells 511, 512, 513, 514, 515, 516 for the first pattern to the input data in the input data ReRAM cells 611, 612, 613, 614, 615, 616 for the first pattern, and (2) a second pattern select line 582 for the second row is activated to compare the stored data in the stored data ReRAM cells 521, 522, 523, 524, 525, 526 for the second pattern to the input data in the input data ReRAM cells 621, 622, 623, 624, 625, 626 for the second pattern. As shown in FIG. 4, when activated, the pattern select lines 580-582 activate a transistor in each cell in a particular row. Once a cell is activated, the bit lines 571-576, 671-676 can read the state of the ReRAM cell as either in a low resistance state ("0") or a high resistance state ("1"). In one embodiment to provide sufficient flexibility, the resistive element of the ReRAM cell is connected between the transistor and a control voltage (Vh) to correctly polarize the resistive element.

The matching operation works sequentially with one row tested during one authentication cycle at a time with the stored data bit lines 571, 572, 573, 574, 575, 576 and the input data bit lines 671, 672, 673, 674, 675, 676 activated concurrently. The compare circuitry 590 of the two-state CAM 500 can implement the BCAM truth table shown in FIG. 1A using an XOR gate (Exclusive OR) for each bit of the reference pattern. In one embodiment, the compare circuitry 590 includes a comparator 591, 592, 593, 594, 595, 596 for each bit of the reference pattern to compare a bit of the input pattern on an input data bit line 571, 572, 573, 574, 575, 576 to the corresponding bit of the stored reference pattern on a stored data bit line 671, 672, 673, 674, 675, 676. The compare circuitry 590 also includes a matching logic block 598 that outputs a "yes" on the output 599 of the compare circuitry 590 only if all of the comparators 591, 592, 593, 594, 595, 596 sense matches. These comparators 591, 592, 593, 594, 595, 596 can be used to compare the reference pattern and the input pattern in each row of the ReRAM array 510.

As shown in FIG. 4, the exemplary two-state CAM 500 includes compare circuitry 590 that is located outside of the ReRAM array 510. For example, the ReRAM array 510 can be located on a first die and the compare circuitry 590 can be located on a second die, or the ReRAM array 510 and the compare circuitry 590 can be located on the same die. Locating the compare circuitry 590 outside of the ReRAM array 510 simplifies the manufacturing of the ReRAM array 510 and allows greater flexibility in the configuration of the ReRAM array 510 independent of the requirements of the compare circuitry 590. This separation of the ReRAM array 510 from the required control circuitry 590 allows for a ReRAM array on a single die to be divided into different sections (RAM, CAM, etc.) with uniform manufacturing of the ReRAM array.

Figure 5:
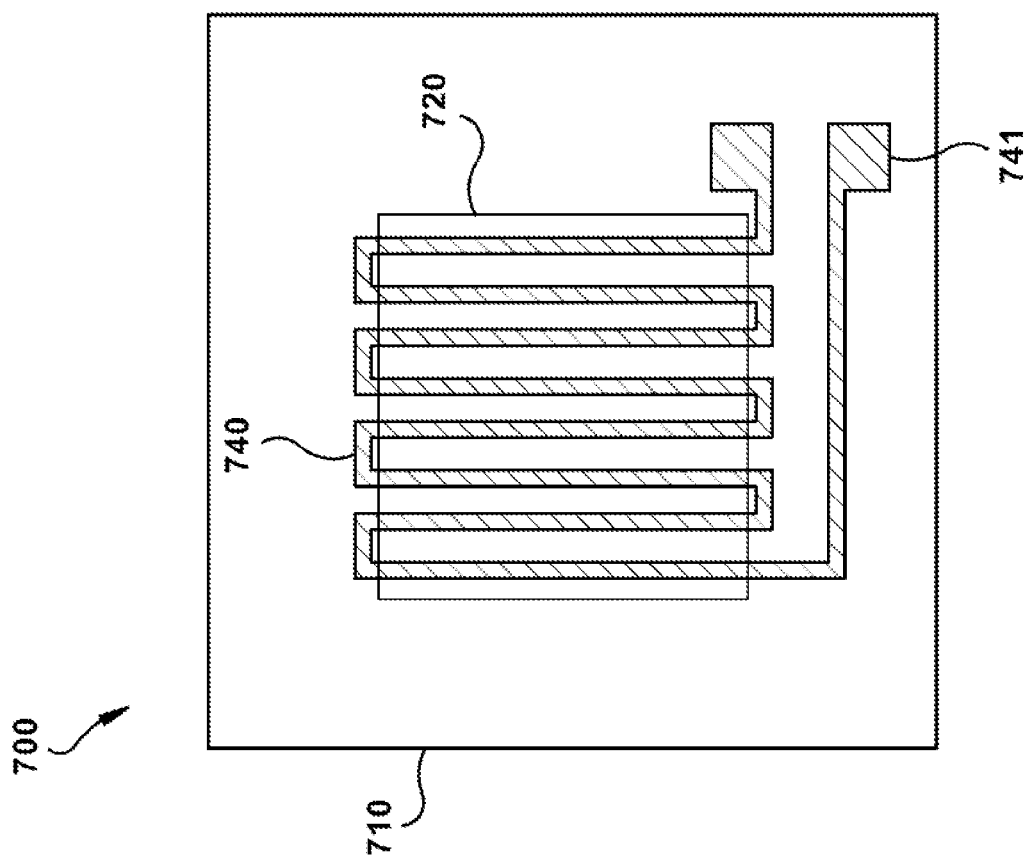
FIG. 5 is a diagram of a system for erasing a ReRAM array using a heater.

FIG. 5 is a diagram of a system 700 for erasing reference patterns in a ReRAM array 720 using a heater 740. ReRAMs are thermally sensitive such that exposure to heat or increased temperature for even short periods of time (e.g., 10 ns or less) can cause the ReRAM cells that are in a low resistance state ("0") to return to a high resistance state ("1"). Ions that were organized during the programming of the ReRAM cell to form a conductive, low resistance state, quickly react to temperature increases and return the ReRAM cells to a high resistance state. In one embodiment, a ReRAM array 720 on a die 710 can include a heater 740 with a heat source 741 that can be activated to erase (e.g., block erase) stored reference patterns in the array 720 when certain conditions are met. For example, the heater can be heated by providing an electric current through the heater for a short time to heat the ReRAM array 720 and erase all or some of the reference patterns stored in the ReRAM array 720 if there are repeated failed attempts during successive authentication cycles, a physical attack on a device, suspicious activity around a device, a refresh cycle, or scheduled password expirations. In some applications, it may be desirable to erase the reference patterns on a regular basis to download computer generated codes that change constantly. In other applications, it may desirable to erase the reference patterns on demand to download updated passwords. In the exemplary embodiment shown in FIG. 5, the heater 740 includes a serpentine conductive line (e.g., made of metal (copper, aluminum, tungsten, titanium, doped polysilicon, or any conductive element)) that is located on (e.g., above or below) the ReRAM array 720. The heater 740 can be manufactured as part of the manufacturing process for the ReRAM array 720 or added later after the ReRAM array 720 is manufactured. It will be understood that various structures and techniques other than the serpentine conductive line can be used to heat the ReRAM array 720 for the purpose of erasing reference patterns.

As shown FIG. 5 the exemplary ReRAM array 720 can integrate an additional metal connection located just above the entire array 720 of ReRAM cells. Such an additional serpentine can be implemented using a metal line, usually built with copper, as part of a mainstream manufacturing process. This serpentine can also be implemented using a metal line located underneath the ReRAM array 720 as part of the mainstream manufacturing process. In the case of an instruction to do so by the state machine, an electric current can quickly increase the temperature, and erase the information stored in the ReRAM array 720. Such a block erase effect can be effective in a ReRAM cell, which is extremely thermal sensitive, and can be done in less than 10 ns. The ions that have been organized during the programming of each ReRAM cell, to form a conductive state quickly react to temperature increase, and return the cells to a high resistance state. Examples of conditions when it would be desirable to erase a reference pattern stored in a ReRAM cell, but not limited to, the response to an unwelcomed attack, suspicious activity around the device, computer generated code change, refresh cycles, or scheduled password expiration.

Figure 6:
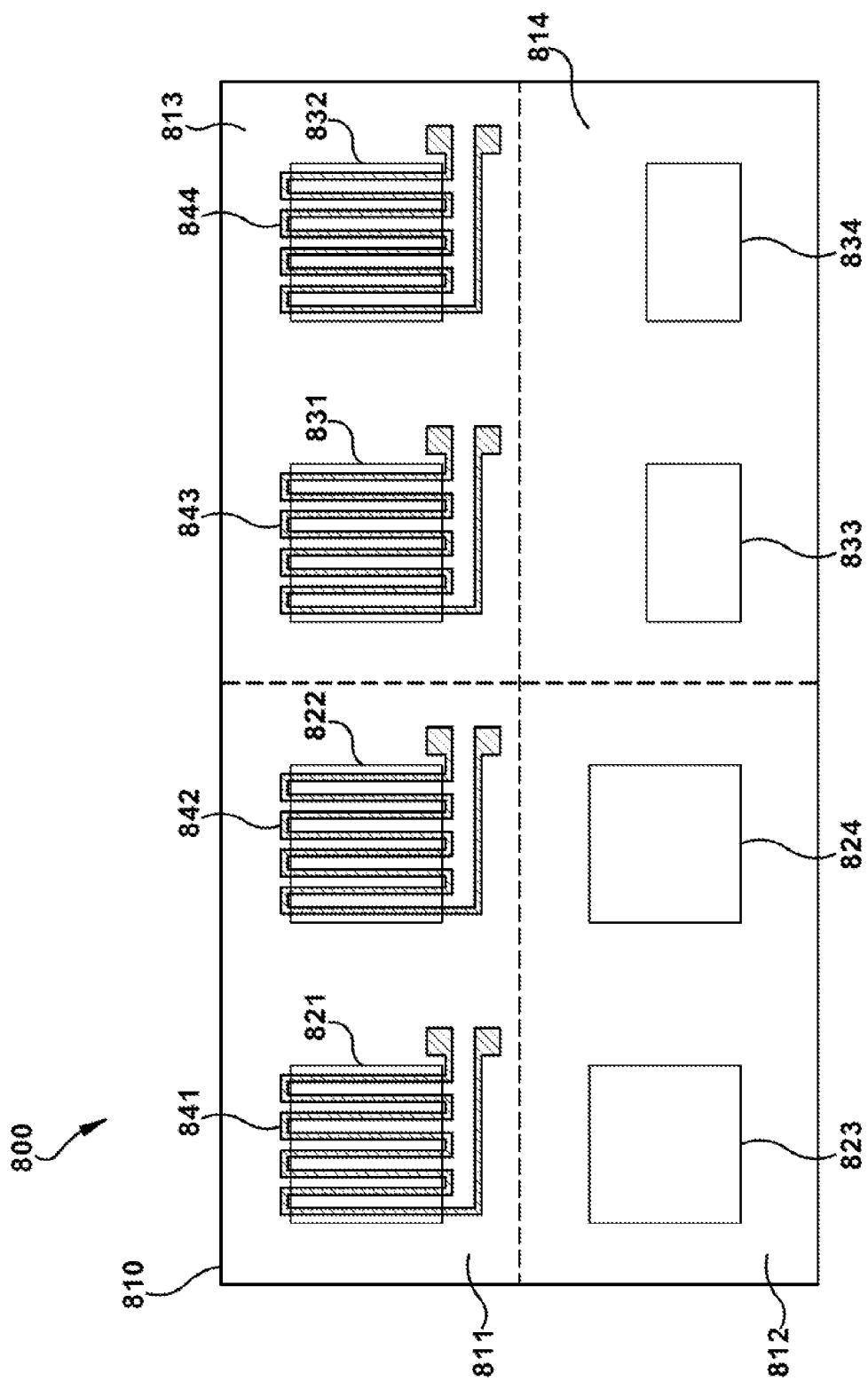
FIG. 6 is a multi-architecture memory system containing ReRAM arrays configured with different architectures on the same die.

As mentioned above, because the control circuitry for a CAM is located outside of the ReRAM array, a single ReRAM die can have portions of the chip designed as a CAM and portions designed as a conventional RAM, all using ReRAM arrays. FIG. 6 illustrates a multi-architecture memory system 800 containing ReRAM arrays 821-824, 831-834 configured with different architectures on the same die 810. The exemplary die 810 is divided into four sections: a first section 811, a second section 812, a third section 813, and a fourth section 814. The first section 811 of the die 810 includes a first ReRAM RAM array 821 and a second ReRAM RAM array 822, both configured as a RAM, while the second section 812 of the die 810 includes a third ReRAM RAM array 823 and a fourth ReRAM RAM array 824, also both configured as a RAM. Reference patterns that need to be quickly extracted from memory to perform cryptographic computations can be stored in the ReRAM RAM arrays 821-824. Such reference patterns to be stored in a RAM can include public keys for Public Key Infrastructure (PKI) implementation using algorithms such as Rivest-Shamir-Adleman cryptosystem (RSA), DSA, and Elliptic Curves (ECC). ReRAM cells are suitable for such quick extraction since they are very fast and require low power. The first ReRAM RAM array 821 includes a heater 841 for erasing the ReRAM array 821, while the second ReRAM RAM array 822 also includes a heater 842 for erasing the ReRAM RAM array 822. As discussed above, this addition of the heaters 841, 842 provides the ability to erase the ReRAM RAM arrays 821, 822 under certain conditions.

The third section 813 of the die 810 includes a first ReRAM CAM array 831 and a second ReRAM CAM array 832, both configured as a CAM, while the fourth section 814 of the die 810 includes a third ReRAM CAM array 833 and a fourth ReRAM CAM array 834, also both configured as a CAM. Secret reference patterns that are used for authentication can be stored on the same die in CAMs to be compared with input patterns without being extracted and without a read cycle, increasing the level of security. Such reference patterns can include biometric prints and pin codes. Symmetrical reference patterns for algorithms such as Data Encryption Standard (DES), Advanced Encryption Standard (AES), and others can be stored in RAMs for computation or in CAMs for authentication. The first ReRAM CAM array 831 includes a heater 843 for erasing the ReRAM CAM array 831, while the second ReRAM CAM array 832 also includes a heater 844 for erasing the ReRAM CAM array 832. As discussed above, this addition of the heaters 843, 844 provides the ability to erase the ReRAM CAM arrays 831, 832 under certain conditions. As discussed above with respect to FIGS. 2-4, the compare circuitry for the CAMs can be located outside of the ReRAM CAM arrays 831-834, including on a separate die.

The ability to divide a ReRAM die into several different sections with different architectures (RAM, CAM, etc.) is particularly useful given that new secure elements may have as many as twenty to thirty reference patterns that may need to be handled differently with different levels of security. For example, with reference to FIG. 6, those reference patterns requiring the lowest level of protection (e.g., public cryptographic keys, operating systems, client database) can be stored on the second section 812 of the die 810 that includes the third ReRAM RAM array 823 and the fourth ReRAM RAM array 824, both without a heater. Those reference patterns requiring a higher level of protection (e.g., identification information, physical unclonable functions) can be stored on the fourth section 814 of the die 810 that includes the third ReRAM CAM array 833 and the fourth ReRAM CAM array 834, both without a heater. Those reference patterns requiring a still higher level of protection (private cryptographic keys, symmetrical cryptographic keys) that need to be extracted can be stored on the first section 811 of the die 810 that includes the first ReRAM RAM array 821 and the second ReRAM RAM array 822, both with heaters 841, 842. Finally, those reference patterns requiring the highest level of protection (e.g., biometric authentication prints such as fingerprints and face recognition) that will not be extracted can be stored on the third section 813 of the die 810 that includes the first ReRAM CAM array 831 and the second ReRAM CAM array 832, both with heaters 843, 844. In one embodiment, a designer can partition multiple reference patterns among the four sections of the die 811, 812, 813, 814. For example, an encrypted reference pattern can be stored in the non-erasable sections without the heaters while the reference pattern to decrypt the encrypted reference pattern can be stored in an erasable section with a heater. Although the exemplary embodiment illustrating the multi-architecture memory system 800 of FIG. 6 is shown using ReRAM arrays, it will be understood that other memory types can also be used to create, e.g., CAMs and RAMs on the same die.

Figure 7:
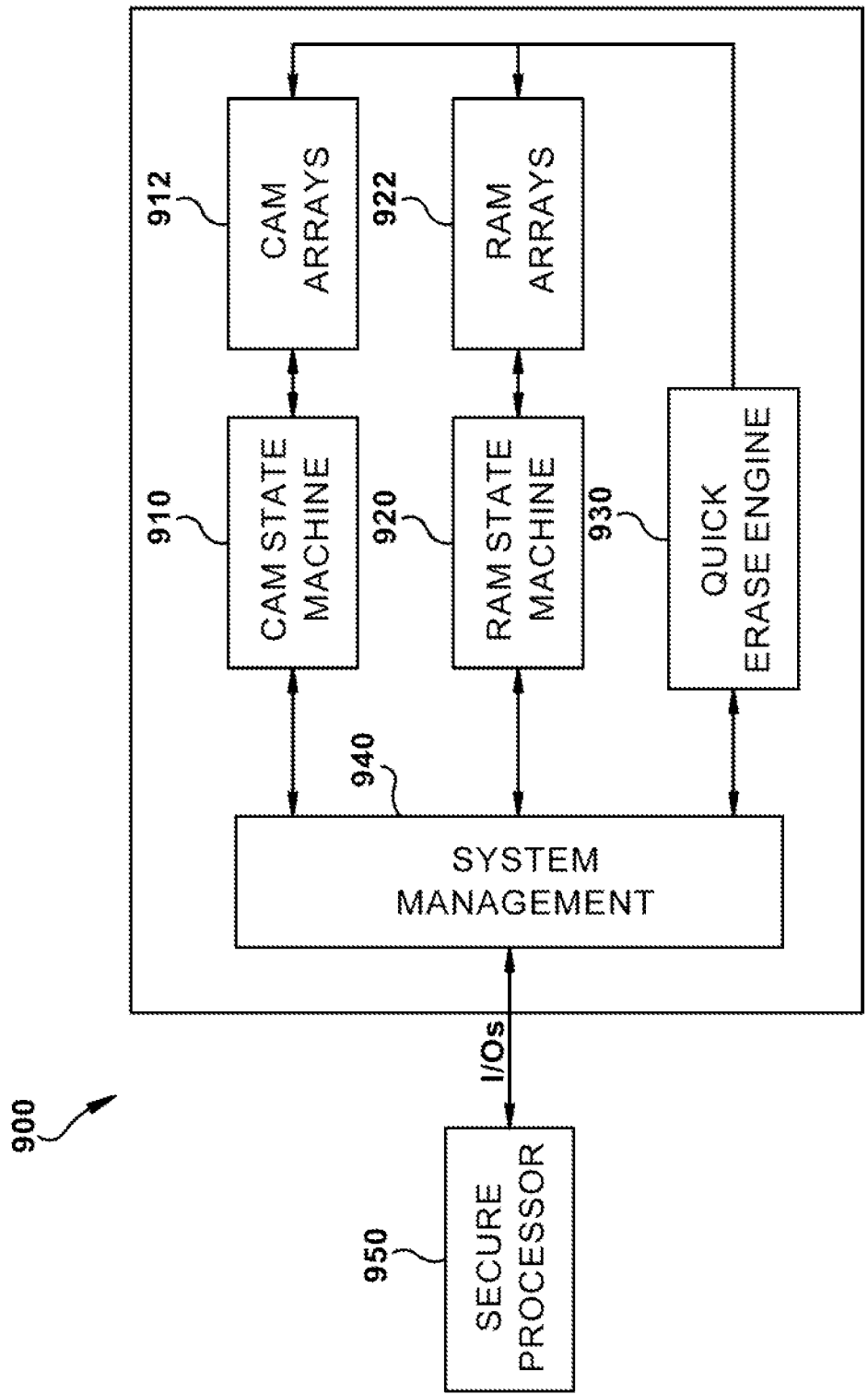
FIG. 7 is a block diagram of the state machine of the secure element.

FIG. 7 is a block diagram of the state machine of the secure element 900. The secure element 900 includes a CAM State Machine 910 that downloads reference patterns and performs matching operations for the CAM arrays 912 on demand. The matching is done without a read cycle to protect the information. This CAM state machine 910 can have additional instructions such as conditioning the arrays before storage, Built-In-Self-Test and verification, and error corrections. A RAM State Machine 920 that downloads reference patterns and extracts the reference patterns on demand for the RAM arrays 922. This RAM state machine 920 incorporates the instructions of a traditional ReRAM, and can manage the storage of databases that may not be related to security. This could include the operating system, client address books, and service related data. The secure element 900 also includes a quick erase engine 930 that manages the life of the reference patterns. This includes triggering a quick erase in case of an attack or suspicious activity, as well as erasing in a well organized way the reference patterns that are scheduled to be erased. The state machines 910, 920 and quick erase engine 930 communications with a system management module 940 that communicates with a secure processor 950. In one embodiment, the state machines are configured using arithmetic logic units (ALUs) or similar structures.

The use of ReRAM architecture has several advantages. First, since ReRAM cells are non-volatile, the reference patterns will be stored even when there is a loss of power or during power off cycles. In addition, since ReRAM cells do not trap charges, the cells are invisible during e-beam deflection attacks. These ReRAM cells hold information much longer than a Dynamic Random Access Memory (DRAM) and operate much faster and at lower power levels than Flash. ReRAM cells also have shown a large and rapid swing between a high resistivity range and a low resistivity range. Furthermore, since ReRAM cells operate at very low power, side channel attacks such as Differential Power Analysis (DPA) and electromagnetic interference (EMI) detection are much more difficult. In general side channel attacks that take advantage of the charges trapped in SRAM and Flash memories, RAM or CAM, will not be convenient to break resistive memories. This make resistive memories an advantageous choice to enhance security.

In one embodiment, the physical properties of the ReRAM cells can be adjusted so that the low resistance state can switch back to a high resistance state over time (e.g., a few weeks or months). This can be used in the case of the theft of a ReRAM-based secure element such that the reference pattern stored in the ReRAM will disappear after a period of time. So while such a limitation on non-volatility of a ReRAM are typically not desirable, it can be used in, e.g., access cards, transport titles, payment cards, entry visas, and temporary titles so that the reference patters will expire after a predetermined time period.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A secure element comprising:
a first die;
a first resistive random access memory (ReRAM) array configured as a content addressable memory (CAM) located on the first die, wherein the CAM comprises a first block of a plurality of ReRAM cells configured for storing a first reference pattern and a second block of a plurality of ReRAM cells configured for receiving a first input pattern;

a second ReRAM array configured as a random access memory (RAM) located on the first die, wherein the RAM comprises a third block of a plurality of ReRAM cells configured for storing a second reference pattern, a compare circuit for comparing the first block of a plurality of ReRAM cells configured for storing the first reference pattern to the second block of a plurality of ReRAM cells configured for receiving the first input pattern, wherein the compare circuit comprises a plurality of comparators and is located outside of the first ReRAM array and the second ReRAM array;

a first heater located on the first ReRAM array configured as a CAM, wherein the first heater is configured to heat the first ReRAM array and erase the first reference pattern; and wherein the first reference pattern comprises a reference authentication cryptographic key stored in the first block of a plurality of ReRAM cells in the CAM and the first input pattern comprises an input authentication cryptographic key provided during an authentication cycle.

2. The secure element of claim 1, further comprising a second die separate from the first die, wherein the compare circuit is located on the second die.

3. The secure element of claim 1, further comprising a second heater located on the second ReRAM array configured as a RAM, wherein the second heater is configured to heat the second ReRAM array and erase the second reference pattern.

4. The secure element of claim 3, wherein the second heater comprises a conductive line configured to heat the second ReRAM array and erase the second reference pattern when an electric current runs through the conductive line.

5. The secure element of claim 1, further comprising:
a third ReRAM array configured as a content CAM located on the first die, wherein the CAM comprises a fourth block of a plurality of ReRAM cells configured for storing a third reference pattern and a fifth block of a plurality of ReRAM cells configured for receiving a second input pattern;
a fourth ReRAM array configured as a RAM located on the first die, wherein the RAM comprises a sixth block of a plurality of ReRAM cells configured for storing a fourth reference pattern; and
a second heater located on the second ReRAM array configured as a RAM, wherein a second heater is configured to heat the second ReRAM array and erase the second reference pattern.

6. The secure element of claim 1, wherein the first heater comprises a conductive line configured to heat the first ReRAM array and erase the first reference pattern when an electric current runs through the conductive line.

7. The secure element of claim 1, wherein the first ReRAM array comprises phase change memories (PCM), conductive bridge random access memory (CBRAM), or metal oxide ReRAMs.

8. The secure element of claim 1, further comprising:
a first plurality of bit lines connected to the first block of a plurality of ReRAM cells; and
a second plurality of bit lines connected to the second block of a plurality of ReRAM cells.

9. The secure element of claim 1, wherein the second reference pattern is one of a private cryptographic key, a public cryptographic key, or a symmetrical cryptographic key.

10. A secure element comprising:
a first die;
a first resistive random access memory (ReRAM) array configured as a content addressable memory (CAM) located on the first die, wherein the CAM comprises a first block of a plurality of ReRAM cells configured for storing a first reference pattern and a second block of a plurality of ReRAM cells configured for receiving a first input pattern;
a second ReRAM array configured as a random access memory (RAM) located on the first die, wherein the RAM comprises a third block of a plurality of ReRAM cells configured for storing a second reference pattern,
a compare circuit for comparing the first block of a plurality of ReRAM cells configured for storing the first reference pattern to the second block of a plurality of ReRAM cells configured for receiving the first input pattern, wherein the compare circuit comprises a plurality of comparators and is located outside of the first ReRAM array and the second ReRAM array;
a first heater located on the second ReRAM array configured as a RAM, wherein the first heater is configured to heat the second ReRAM array and erase the second reference pattern; and
wherein the second reference pattern is one of a private cryptographic key, a public cryptographic key, or a symmetrical cryptographic key.

11. The secure element of claim 10, wherein the compare circuit is located on a second die separate from the first die.

12. The secure element of claim 10, wherein the first ReRAM array comprises phase change memories (PCM), conductive bridge random access memory (CBRAM), or metal oxide ReRAMs.

13. The secure element of claim 10, wherein the first heater comprises a conductive line configured to heat the second ReRAM array and erase the second reference pattern when an electric current runs through the conductive line.

14. The secure element of claim 10, further comprising:
a third ReRAM array configured as a content CAM located on the first die, wherein the CAM comprises a fourth block of a plurality of ReRAM cells configured for storing a third reference pattern and a fifth block of a plurality of ReRAM cells configured for receiving a second input pattern;
a fourth ReRAM array configured as a RAM located on the first die, wherein the RAM comprises a sixth block of a plurality of ReRAM cells configured for storing a fourth reference pattern; and
a second heater located on the first ReRAM array configured as a CAM, wherein the first heater is configured to heat the first ReRAM array and erase the first reference pattern.

15. The secure element of claim 10, wherein the first reference pattern comprises a reference authentication cryptographic key stored in the first block of a plurality of ReRAM cells in the CAM and the first input pattern comprises an input authentication cryptographic key provided during an authentication cycle.

* * * * *